(12) United States Patent
Balla et al.

(10) Patent No.: US 12,716,381 B2
(45) Date of Patent: Aug. 25, 2026

(54) COMPACT CORE ARRANGEMENT FOR HIGH BYPASS RATIO GAS TURBINE ENGINE ARCHITECTURE

(71) Applicant: General Electric Company, Schenectady, NY (US)

(72) Inventors: Ramesh Balla, Bengaluru (IN); Bhaskar Nanda Mondal, Bangalore (IN); Thomas O. Moniz, Mason, OH (US)

(73) Assignee: General Electric Company, Evendale, OH (US)

( * ) Notice: Subject to any disclaimer, the term of this patent is extended or adjusted under 35 U.S.C. 154(b) by 0 days.

(21) Appl. No.: 18/618,462

(22) Filed: Mar. 27, 2024

(65) Prior Publication Data

US 2025/0305447 A1 Oct. 2, 2025

(51) Int. Cl.
*F02C 3/06* (2006.01)
*F02C 7/06* (2006.01)

(52) U.S. Cl.
CPC . *F02C 3/06* (2013.01); *F02C 7/06* (2013.01)

(58) Field of Classification Search
CPC ................ F02C 7/06; F02C 3/06; F01D 5/30
See application file for complete search history.

(56) References Cited

U.S. PATENT DOCUMENTS 4,460,315 A * 7/1984 Tseng .................... F01D 5/3038 416/216
5,067,876 A * 11/1991 Moreman, III ....... F01D 5/3007 416/248
5,108,261 A * 4/1992 Ress, Jr. ............... F04D 29/321 416/193 A
5,310,319 A 5/1994 Grant et al.
6,267,553 B1 * 7/2001 Burge ....................... F01D 5/06 416/198 A
6,354,780 B1 * 3/2002 Davis .................... F16F 15/322 416/190
6,454,535 B1 * 9/2002 Goshorn ................ F01D 5/022 416/234
6,511,294 B1 * 1/2003 Mielke ...................... F01D 5/06 416/193 A
7,445,433 B2 * 11/2008 Chivers ..................... F01D 5/34 416/193 A
8,287,242 B2 * 10/2012 Bifulco ................... F01D 5/025 415/216.1
8,464,426 B2 * 6/2013 Kirchner .............. F04D 29/324 416/223 R (Continued)

FOREIGN PATENT DOCUMENTS

EP 1098092 A2 * 5/2001 ............. F01D 5/284
EP 4435248 A1 * 9/2024 ............... F02K 3/06

*Primary Examiner* — Craig Kim
(74) *Attorney, Agent, or Firm* — Dinsmore & Shohl LLP

(57) ABSTRACT

Structures for achieving high bypass ratio in gas turbine engines are described. A gas turbine engine includes a compressor section, a combustion section, a turbine section, and an exhaust section. The compressor section includes a first booster, a second booster, and a blisk including an inclined web and offset bore. An angle of inclination relative to a vertical plane is between 5° and 55°. The vertical plane is perpendicular to an axial direction that is parallel to a longitudinal centerline defined by the gas turbine engine. The turbine section includes a first turbine and a second turbine.

20 Claims, 6 Drawing Sheets

(56) References Cited

U.S. PATENT DOCUMENTS 10,605,260 B2 * 3/2020 Pan ........ F04D 29/542
10,801,442 B2 * 10/2020 Clements ........ F02C 3/067
11,111,858 B2 9/2021 Miller et al.
11,231,043 B2 * 1/2022 Vanapalli ........ F04D 29/324
11,486,311 B2 * 11/2022 Adams ........ F01D 25/24
12,071,959 B1 * 8/2024 Duong ........ F04D 29/526
2004/0060279 A1 * 4/2004 Robert Joseph ........ F01D 1/24 60/226.1
2005/0186080 A1 * 8/2005 Chivers ........ F01D 5/3061 416/223 R
2006/0272314 A1 * 12/2006 Moniz ........ F01D 5/141 60/39.162
2009/0016886 A1 * 1/2009 Pichel ........ F01D 5/025 416/198 A
2010/0043512 A1 * 2/2010 Bayer ........ B24C 5/005 451/39
2013/0259643 A1 * 10/2013 Schwarz ........ F02C 3/067 415/68
2014/0174098 A1 6/2014 Duong et al.
2015/0009630 A1 1/2015 Tuen et al.
2016/0069260 A1 * 3/2016 Speak ........ F02C 7/36 415/69
2016/0186773 A1 * 6/2016 DiPietro, Jr. ........ F04D 29/324 416/183
2016/0245089 A1 * 8/2016 Keenan ........ F01D 5/06
2018/0209336 A1 * 7/2018 Stuart ........ F01D 1/24
2019/0330985 A1 * 10/2019 Montes Parra ........ F01D 5/10
2020/0040846 A1 * 2/2020 Lugg ........ H02K 55/02
2020/0263555 A1 * 8/2020 Stuart ........ F01D 25/246
2021/0301764 A1 9/2021 Stieger
2021/0310363 A1 * 10/2021 McCaffrey ........ F01D 5/3084
2021/0324740 A1 * 10/2021 Ristau ........ F01D 5/225
2023/0043965 A1 * 2/2023 Stone ........ F01D 5/34
2023/0203953 A1 * 6/2023 Glavicic ........ C22F 1/183 29/889.7
2023/0211885 A1 * 7/2023 Payyoor ........ F02C 7/06 244/54
2023/0272750 A1 * 8/2023 Gräber ........ F02C 7/36 415/122.1
2024/0003538 A1 1/2024 Go et al.
2024/0044253 A1 * 2/2024 Kray ........ F02K 3/06
2024/0082755 A1 * 3/2024 Sidorovich Paradiso ........ F16N 39/002
2024/0318614 A1 * 9/2024 Mondal ........ F02K 3/06
2024/0410285 A1 * 12/2024 Kray ........ F01D 5/282
2025/0027427 A1 * 1/2025 Rambo ........ F02C 7/36

* cited by examiner

Vh
Ch
188a
266
272
286
292
296
260
206
274
290
186a
262
264
211
294
210
284
268
282
188b
266
292
260
A
186b
290
264
204
188c
268
282
293
θ
291
R

COMPACT CORE ARRANGEMENT FOR HIGH BYPASS RATIO GAS TURBINE ENGINE ARCHITECTURE

FIELD

The present disclosure relates to gas turbine engines, and more specifically, to features of a compact core arrangement for high bypass ratio gas turbine engine architecture.

BACKGROUND

A gas turbine engine for commercial aircraft typically includes a fan and a turbomachine. The turbomachine, which is commonly referred to as the core, generally includes a compressor section, a combustion section, and a turbine section in serial flow arrangement. The compressor section compresses air that is channeled to the combustion section where it is mixed with fuel. The mixture is then ignited for generating hot combustion gases. The combustion gases are channeled to the turbine section which extracts energy from the combustion gases for powering the compressor section, as well as for producing work, such as for propulsion of an aircraft in flight, or for powering a machine such as an electrical generator.

Achieving increases in bypass ratio can impact considerations for increasing shaft dimensions. This can be due to increased fan size diameter. For example, one set of compressors and turbines may be connected to a shaft, and a second set of compressors and turbines may be connected to a larger shaft. However, there are limitations on how much larger the shafts can become, especially when taking into account achieving an increased bypass ratio.

BRIEF DESCRIPTION OF THE DRAWINGS

The embodiments set forth in the drawings are illustrative and exemplary in nature and not intended to limit the subject matter defined by the claims. The following detailed description of the illustrative embodiments can be understood when read in conjunction with the following drawings, where like structure is indicated with like reference numerals and in which:

DETAILED DESCRIPTION

Figure 1:
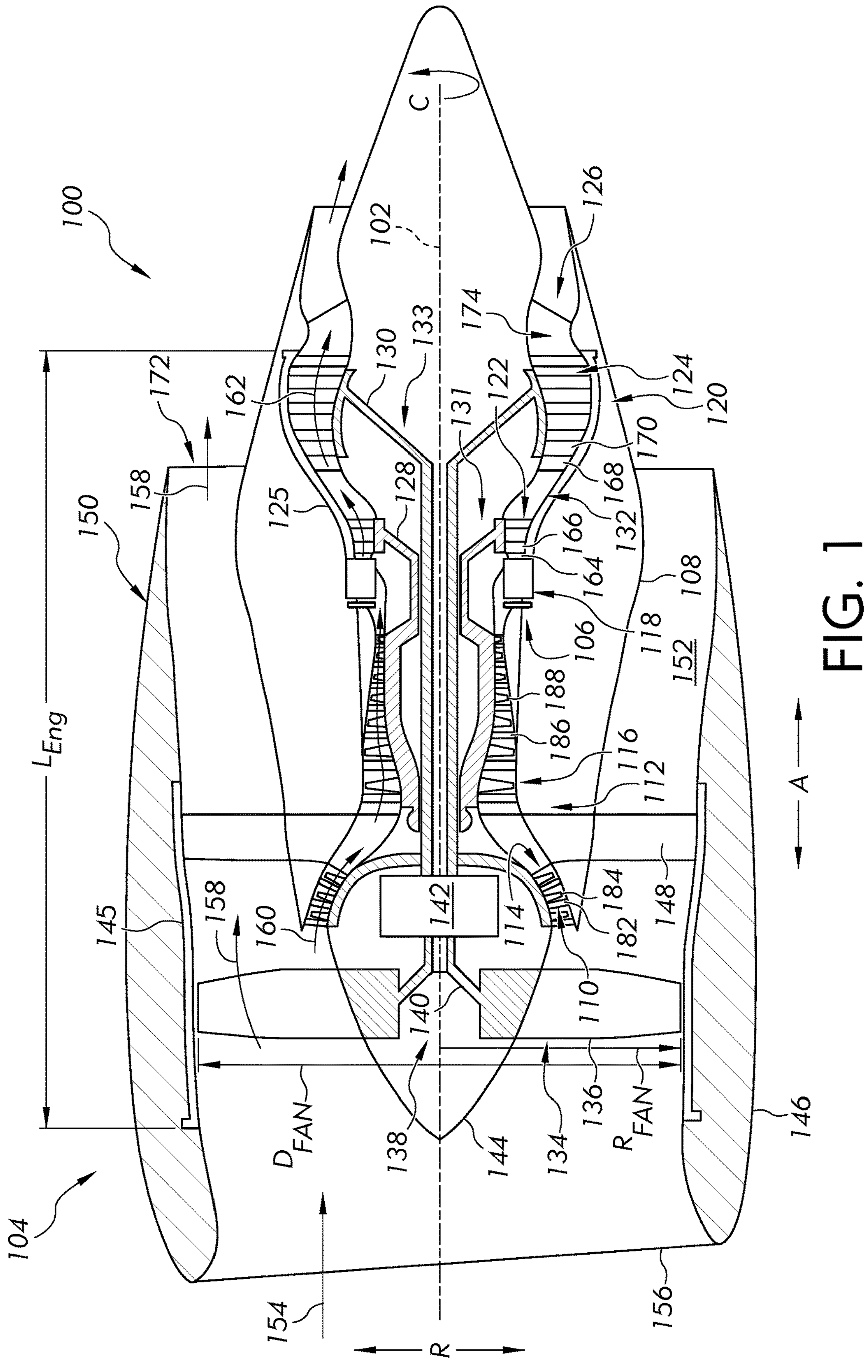
FIG. 1 schematically depicts a cross-sectional view of a gas turbine engine, according to one or more aspects described and illustrated herein.

Reference will now be made in detail to present embodiments of the disclosure, one or more examples of which are illustrated in the accompanying drawings. The detailed description uses numerical and letter designations to refer to features in the drawings. Like or similar designations in the drawings and description have been used to refer to like or similar parts of the disclosure.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

The term "at least one of" in the context of, e.g., "at least one of A, B, and C" refers only A, only B, only C, or any combination of A, B, and C.

The terms "forward" and "aft" refer to relative positions within a gas turbine engine, pump, or vehicle, and refer to the normal operational attitude of the gas turbine engine, pump, or vehicle. For example, with regard to a gas turbine engine, forward refers to a position closer to an engine inlet and aft refers to a position closer to an engine nozzle or exhaust.

The terms "upstream" and "downstream" refer to the relative direction with respect to a flow in a pathway. For example, with respect to a fluid flow, "upstream" refers to the direction from which the fluid flows, and "downstream" refers to the direction toward which the fluid flows.

As used in this application, stating that any part (e.g., an area) is in any way on (e.g., positioned on, located on, disposed on, or formed on, etc.) another part, indicates that the referenced part is either in contact with the other part, or that the referenced part is above the other part with one or more intermediate part(s) located therebetween.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

Approximating language, as used herein throughout the specification and claims, is applied to modify any quantitative representation that could permissibly vary without resulting in a change in the basic function to which it is related. Accordingly, a value modified by a term or terms, such as "about" and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a ten percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Due to high bypass ratio, a ratio of the length (L) and diameter (D), referred to herein as L/D, of a core possesses a significant challenge on pressure mode operation. Further, due to high-speed low pressure shafts, the engine core length impacts mid-shaft mode margin. In order to reduce the L/D of high pressure and low pressure shafts, it is beneficial for the span of the high pressure and low pressure spool to be reduced.

As one approach to solve the above problem, a reduction in the number of compressor stages may be considered. However, there are numerous drawbacks in this implementation. For example, as the number of stages is reduced, the same pressure ratio is not possible, which reduces efficiency of the engine. In addition, because of the reduced number of compressor stages, the RPM of a spool will increase, which adversely impacts dynamics margin.

To address the above, at least one of the plurality of compressor stages, such as the first compressor stage, is inclined. In doing so, the overall length (L) (span between bearings) over diameter (D) (diameter of the shaft) (L/D) of the spool is reduced, therefore leading to improved dynamics margin. By inclining at a particular angle, despite being potentially susceptible in terms of taking radial loads of airfoil, the benefit in improving the dynamics margin is achieved while still retaining the efficiency of that of the plurality of compressor stages that have not been reduced in number.

Referring now to the drawings, FIG. 1 provides a schematic cross-sectional view of a turbofan engine 100 according to an example embodiment of the present disclosure. For the depicted embodiment of FIG. 1, the turbofan engine 100 is an aeronautical, high-bypass turbofan engine configured mountable to an aircraft, such as, for example, in an underwing configuration. As shown, the turbofan engine 100 defines an axial direction A, a radial direction R, and a circumferential direction C. The axial direction A extends parallel to or coaxial with a longitudinal centerline 102 defined by the turbofan engine 100. In certain embodiments, the turbofan engine 100 may include any type of engine, including but not limited to an aviation gas turbine engine, a marine or a power generation gas turbine engine, or any other type of gas turbine.

The turbofan engine 100 includes a fan section 104 and a core turbine engine 106 disposed downstream of the fan section 104. The core turbine engine 106 includes an engine cowl 108 that defines an annular core inlet 110. The engine cowl 108 encases, in a serial flow relationship, a compressor section 112 including a first booster (e.g., an LP compressor 114) and a second booster (e.g., an HP compressor 116), a combustion section 118, a turbine section 120 including a first turbine (e.g., an HP turbine 122) and a second turbine (e.g., an LP turbine 124), and an exhaust section 126. The compressor section 112, combustion section 118, turbine section 120, and exhaust section 126 together define a core air flowpath 132 through the core turbine engine 106.

An HP shaft 128 drivingly connects the HP turbine 122 to the HP compressor 116. An LP shaft 130 drivingly connects the LP turbine 124 to the LP compressor 114. The HP shaft 128, the rotating components of the HP compressor 116 that are mechanically coupled with the HP shaft 128, and the rotating components of the HP turbine 122 that are mechanically coupled with the HP shaft 128 collectively form a high pressure spool, or HP spool 131. The LP shaft 130, the rotating components of the LP compressor 114 that are mechanically coupled with the LP shaft 130, and the rotating components of the LP turbine 124 that are mechanically coupled with the LP shaft 130 collectively form a low pressure spool, or LP spool 133.

The fan section 104 includes a fan assembly 138 having a fan 134 mechanically coupled with a fan rotor 140. The fan 134 has a plurality of fan blades 136 circumferentially-spaced apart from one another. As depicted, the fan blades 136 extend outward from the fan rotor 140 along the radial direction R. A power gearbox 142 mechanically couples the LP spool 133 and the fan rotor 140. The power gearbox 142 may also be called a main gearbox. The power gearbox 142 includes a plurality of gears for stepping down the rotational speed of the LP shaft 130 to provide a more efficient rotational fan speed of the fan 134. In other example embodiments, the fan blades 136 of the fan 134 can be mechanically coupled with a suitable actuation member configured to pitch the fan blades 136 about respective pitch axes, such as, for example, in unison. In some alternative embodiments, the turbofan engine 100 does not include the power gearbox 142. In such alternative embodiments, the fan 134 can be directly mechanically coupled with the LP shaft 130, such as, for example, in a direct drive configuration.

Referring still to FIG. 1, the fan rotor 140 and hubs of the fan blades 136 are covered by a rotatable spinner 144 aerodynamically contoured to promote an airflow through the plurality of fan blades 136. Additionally, the fan section 104 includes an annular fan casing 145 and an outer nacelle 146 connected to the fan casing 145. The fan casing 145 and the outer nacelle 146 both circumferentially surround the fan 134 and/or at least a portion of the core turbine engine 106. The fan casing 145 and the outer nacelle 146 are supported relative to the core turbine engine 106 by a plurality of circumferentially-spaced outlet guide vanes 148. A downstream section 150 of the nacelle 146 extends over an outer portion of the core turbine engine 106 so as to define a bypass passage 152 therebetween.

During operation of the turbofan engine 100, a volume of air 154 enters the turbofan engine 100 through an associated inlet 156 of the nacelle 146 and/or fan section 104. As the volume of air 154 passes across the fan blades 136, a first portion of air 158 is directed or routed into the bypass passage 152 and a second portion of air 160 is directed or routed into the annular core inlet 110. The pressure of the second portion of air 160 is progressively increased as it flows downstream through the LP compressor 114 and HP compressor 116. Particularly, the LP compressor 114 includes sequential stages of LP compressor stator vanes 182 and LP compressor blades 184 that progressively compress the second portion of air 160. The LP compressor blades 184 are mechanically coupled to the LP shaft 130. Similarly, the HP compressor 116 includes sequential stages of HP compressor vanes 186 and HP compressor blades 188 that progressively compress the second portion of air 160 even further. The HP compressor blades 188 are mechanically coupled to the HP shaft 128. Additional details regarding the various components of the LP compressor 114 and the HP compressor 116 will be described in greater detail herein-below. The compressed second portion of air 160 is then discharged from the compressor section 112 into the combustion section 118.

The compressed second portion of air 160 discharged from the compressor section 112 mixes with fuel and is burned within a combustor of the combustion section 118 to provide combustion gases 162. The combustion gases 162 are routed from the combustion section 118 along a hot gas path 174 of the core air flowpath 132 through the HP turbine 122 where a portion of thermal and/or kinetic energy from the combustion gases 162 is extracted via sequential stages of HP turbine stator vanes 164 and HP turbine blades 166. The HP turbine blades 166 are mechanically coupled to the HP shaft 128. Thus, when the HP turbine blades 166 extract energy from the combustion gases 162, the HP shaft 128 rotates, which supports operation of the HP compressor 116. The combustion gases 162 are routed through the LP turbine 124 where a second portion of thermal and kinetic energy is extracted from the combustion gases 162 via sequential stages of LP turbine stator vanes 168 and LP turbine blades 170. The LP turbine blades 170 are coupled to the LP shaft 130. Thus, when the LP turbine blades 170 extract energy from the combustion gases 162, the LP shaft 130 rotates and supports operation of the LP compressor 114, as well as the fan 134 by way of the power gearbox 142.

The combustion gases 162 exit the LP turbine 124 and are exhausted from the core turbine engine 106 through the exhaust section 126 to provide propulsive thrust. Simultaneously, the pressure of the first portion of air 158 is substantially increased as the first portion of air 158 is routed through the bypass passage 152 before the first portion of air 158 is exhausted from a fan nozzle exhaust section 172 of the turbofan engine 100, also providing propulsive thrust. The HP turbine 122, the LP turbine 124, and the exhaust section 126 at least partially define the hot gas path 174.

It will be appreciated that the turbofan engine 100 depicted in FIG. 1 is provided by way of example, and that in other example embodiments, the turbofan engine 100 has other configurations. Additionally, or alternatively, aspects of the present disclosure may be utilized with other suitable aeronautical turbofan engines, a turboshaft engine, and turboprop engine.

Figure 2A:
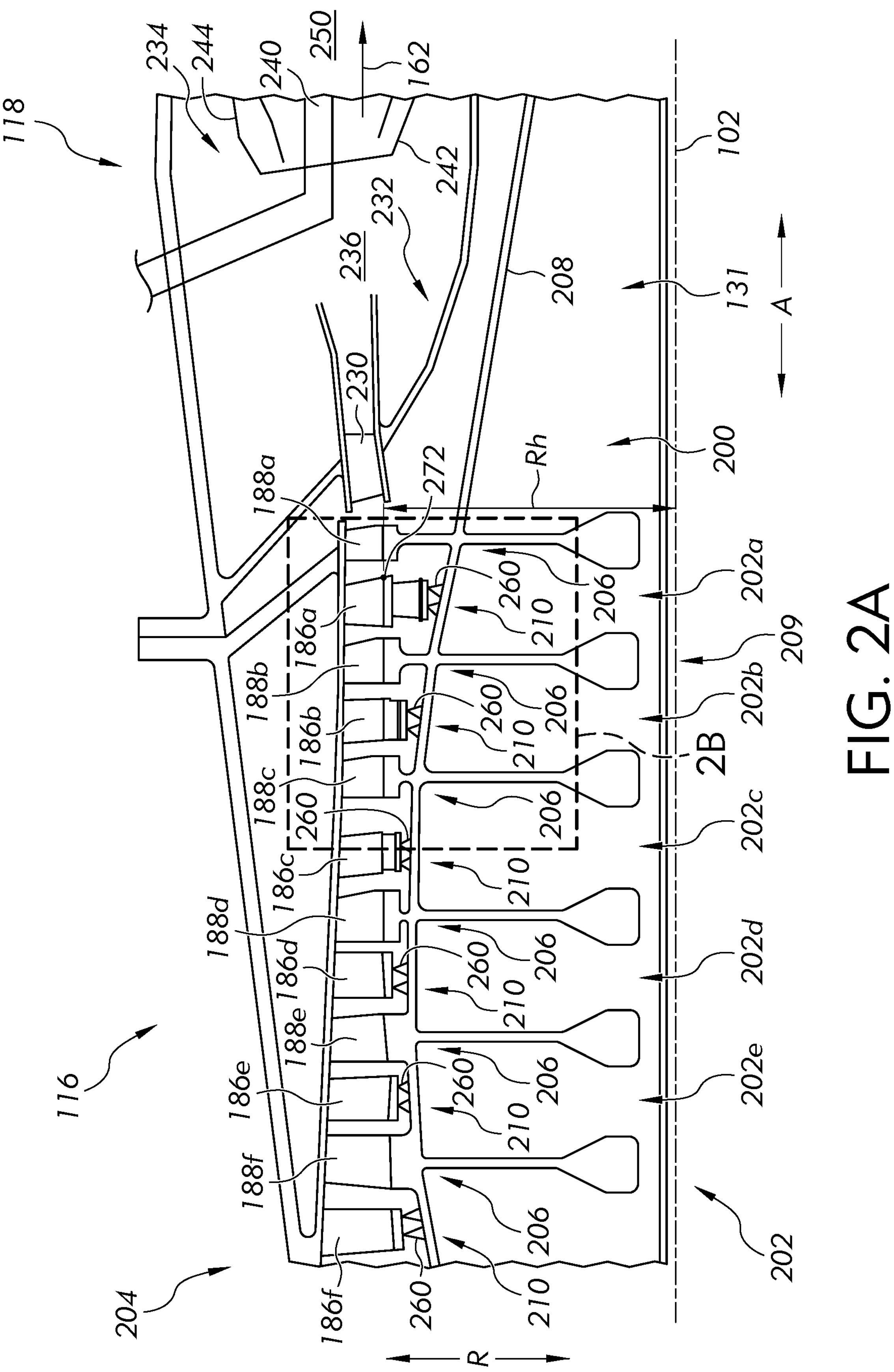
FIG. 2A schematically depicts a plurality of stages of a compressor of the gas turbine engine of FIG. 1, according to one or more aspects described and illustrated herein.

Referring now to FIG. 2A, a schematic, cross-sectional view of a portion of the compressor section 112 and a portion of the combustion section 118 of the turbofan engine 100 of FIG. 1 is provided. More specifically, FIG. 2A depicts an aft end of the HP compressor 116 of the compressor section 112 and a portion of the combustion section 118. However, it should be appreciated that the various components described herein can be included in other compressor sections of the turbofan engine 100, including the LP compressor 114 and/or an intermediate pressure (IP) compressor in 3 spool gas turbine engines.

Figure 2B:
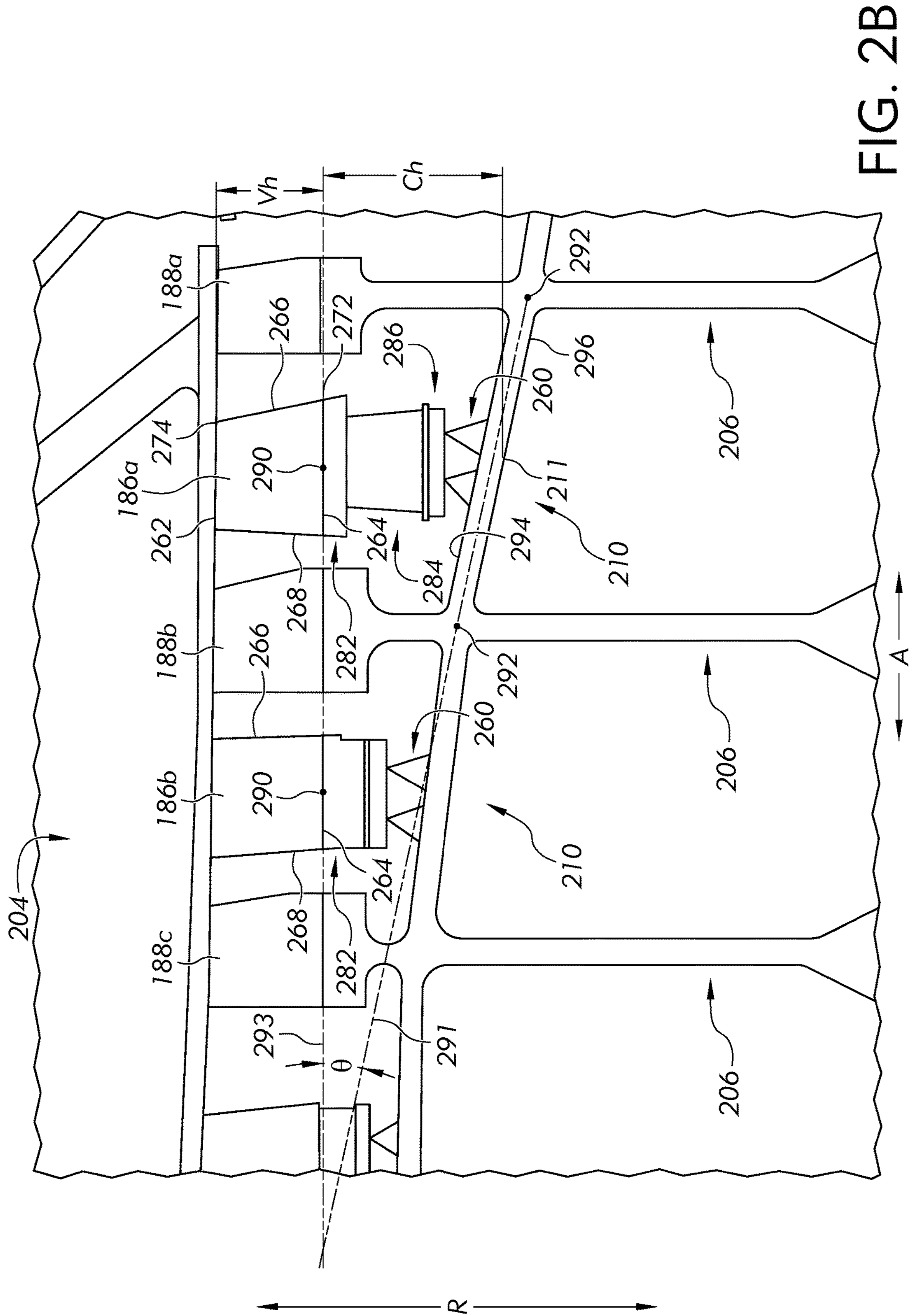
FIG. 2B schematically depicts a detailed view of a portion of the stages of the compressor of FIG. 2A and a portion of a combustion section of the gas turbine engine, according to one or more aspects described and illustrated herein.

Referring to FIGS. 1 and 2A-2B, and as noted above, during operation of the turbofan engine 100, an airflow through the core air flowpath 132 of the turbofan engine 100 is sequentially compressed as it flows through the compressor section 112, or more specifically, as it flows through the LP compressor 114 and the HP compressor 116. The compressed air from the compressor section 112 is then provided to the combustion section 118, wherein at least a portion of the compressed air is mixed with fuel and burned to create the combustion gases 162. The combustion gases 162 flow from the combustion section 118 to the turbine section 120, and more specifically, sequentially through the HP turbine 122 and the LP turbine 124, for the embodiment depicted, driving the HP turbine 122 and the LP turbine 124. The HP spool 131 is drivingly coupled to both the HP turbine 122 and the HP compressor 116.

Referring particularly to FIG. 2A, the HP compressor 116 includes a plurality of compressor stages 202*a*-202*e* (collectively, compressor stages 202), with each of the compressor stages 202 including, for example, a plurality of the HP compressor blades 188 and a rotor 206. While five compressor stages 202 are depicted in FIG. 2A, the HP compressor 116 includes greater than or fewer than five stages in other embodiments. Each of the various compressor stages 202 is drivingly coupled to the HP spool 131, such that the HP turbine 122 (FIG. 1) may drive the HP compressor 116 through the HP spool 131. Amongst the plurality of compressor stages 202 of HP compressor 116, is an aft-most stage 202*a* located at an aft end 200 of the HP compressor 116.

The aft-most stage 202*a* provides compressed air to the combustion section 118. More specifically, for the embodiment depicted in FIG. 2A, the combustion section 118 includes a diffuser 230, an inner combustor casing 232, and a combustor assembly 234. Further, the combustion section 118 defines a diffuser cavity 236, with the diffuser 230 located downstream of the compressor stages 202 of the HP compressor 116 and upstream of the diffuser cavity 236, such that compressed air from the aft-most stage 202*a* is provided to the diffuser cavity 236 through the diffuser 230. The compressed air within the diffuser cavity 236 is, in turn, provided to the combustor assembly 234, where the compressed air is mixed with fuel and burned to generate the combustion gases 162. As is depicted in FIG. 2A, the combustor assembly 234 generally includes a fuel nozzle 240, an inner liner 242, and an outer liner 244, with the inner liner 242 and the outer liner 244 together forming a combustion chamber 250.

It should be appreciated that the combustor assembly 234 is configured as a suitable assembly for the turbofan engine 100 (FIG. 1). For example, in certain embodiments, the combustor assembly 234 is configured as an annular combustor assembly, a can combustor assembly, or a cannular combustor assembly.

Referring still to FIG. 2A, as previously noted, the HP spool 131 is drivingly connected to the HP compressor 116. For the embodiment depicted, the HP spool 131 generally includes a central spool section including a central spool member 208, which may also be referred to herein as an inner circumferential support structure. The central spool member 208 extends, for the embodiment depicted in FIG. 2A, generally along the axial direction A at a location radially inward of the combustor assembly 234 of the combustion section 118. In addition, the central spool member 208 is coupled to or formed integrally with one or more spacer arms 210 located forward of the central spool member 208. The one or more spacer arms 210, for the embodiment depicted, also extend generally along the axial direction A. Together, the central spool member 208 and the one or more spacer arms 210 may form an inner circumferential support structure 209 of the HP compressor 116.

Still referring to FIG. 2A, the aft-most stage 202*a* of the HP compressor 116 represents a final stage of the HP compressor 116 when traversing the HP compressor 116 from fore to aft positions in the axial direction A. One or more forward stages 202*b*-202*e* located forward of the aft-most stage 202*a* include, for example, a first forward stage 202*b*, a second forward stage 202*c*, a third forward stage 202*d*, and a fourth forward stage 202*e*. Each one of the compressor stages 202*a*-202*f* includes corresponding ones of the HP compressor vanes 186 and the HP compressor blades 188. That is, the aft-most stage 202*a* includes an aft-most vane 186*a* (e.g., a first vane) and a first compressor blade 188*a*, the first forward stage 202*b* includes a second vane 186*b* and a second compressor blade 188*b*, the second forward stage 202*c* includes a third vane 186*c* and a third compressor blade 188*c*, the third forward stage 202*d* includes a fourth vane 186*d* and a fourth compressor blade 188*d*, and the fourth forward stage 202*e* includes a fifth vane 186*e* and a fifth compressor blade 188*e*, and so forth (e.g., a sixth vane 186*f* and a sixth compressor blade 188*f*, etc.).

The HP compressor 116 further includes an outer casing 204, which may also be referred to herein as an outer circumferential support structure. The outer casing 204 may extend generally in the axial direction A radially outward of the inner circumferential support structure 209. In some embodiments, the outer casing 204 and the inner circumferential support structure 209 are positioned around a central axis, such as, for example, the longitudinal centerline 102 of the turbofan engine 100 (FIG. 1). That is, the inner circumferential support structure 209 is positioned radially outward of the longitudinal centerline 102 (FIG. 1), and the outer casing 204 is spaced radially outward of the inner circumferential support structure 209, as depicted in FIG. 2A.

Referring to FIGS. 2A and 2B, the various vanes 186 of the compressor generally extend inwardly a distance in the radial direction R from the outer casing 204. Each one of the various vanes 186 extends from the outer casing 204 at a location that is between adjacent compressor blades 188. For example, the aft-most vane 186*a* may extend from the outer casing 204 at a location that is between the first compressor blade 188*a* and the second compressor blade 188*b*. In addition, the various vanes 186 extend towards the inner circumferential support structure 209, particularly one of the one or more spacer arms 210 thereof. In embodiments, one or more components are disposed between the vanes 186 and the corresponding spacer arms 210, such as, for example, an inner platform 282, a seal support structure 284, a seal structure 286, and/or one or more seal teeth 260, as described in greater detail herein.

Referring particularly to FIG. 2B, which schematically depicts an enlarged view of a portion 2B in FIG. 2A, each of the vanes 186 (e.g., the aft-most vane 186*a*, the second vane 186*b*, etc.) includes a root 262, a tip 264, a leading edge 268, and a trailing edge 266. The root 262 of each vane 186 represents a radially outward extent of the vane 186 at a connection point with the outer casing 204. That is, the root 262 of each vane 186 is the part (e.g., end) of the vane 186 that contacts the outer casing 204. The tip 264 of each vane 186 represents a radially inward extent of the vane 186. That is, the tip 264 of each vane 186 is the part (e.g., end) of the vane that is closest to the corresponding spacer arm 210. The leading edge 268 of each vane 186 represents an edge of the vane 186 that extends from the root 262 to the tip 264 and is a forward-most edge of the vane 186 generally in the axial direction (e.g., an edge that receives fluid flowing through the HP compressor 116, as described herein). The trailing edge 266 of each vane 186 represents an edge of the vane 186 that extends from the root 262 to the tip 264 and is an aft-most edge of the vane 186 generally in the axial direction. As such, the trailing edge 266 and the leading edge 268 are opposite one another. In some embodiments, the trailing edge 266 and the leading edge 268 are parallel or substantially parallel to one another. In other embodiments, the trailing edge 266 and the leading edge 268 are not parallel to one another.

As depicted in FIG. 2B, each of the vanes 186 defines a first point 272 and a second point 274. The first point 272 represents the intersection of the tip 264 of the vane 186 with the trailing edge 266 of the vane 186. The second point 274 represents an intersection of the root 262 of the vane 186 with the trailing edge 266 of the vane 186.

As noted herein, one or more components may be disposed between the tip 264 of each vane 186 and the corresponding spacer arm 210, including, for example, the inner platform 282, the seal support structure 284, the seal structure 286, and/or the one or more seal teeth 260. In embodiments, the inner platform 282, the seal support structure 284, the seal structure 286, and the one or more seal teeth 260 appear in serial order from the tip 264 to the corresponding spacer arm 210, with the inner platform 282, the seal support structure 284, and the seal structure 286 coupled to one another and the tip 264 of each vane 186 and the one or more seal teeth disposed on a radially outer surface 294 of the spacer arm 210.

The inner platform 282 is a component that defines a flow path. That is, fluid (e.g., air) movement through each of the compressor stages 202 (FIG. 2A) occurs via the flow path defined by the inner platform 282. The inner platform 282 is coupled to and extends inward along the radial direction R from the tip 264 of the vane 186. As will be appreciated, the inner platform 282 has a shape and surface features that are not necessarily limited to the shape and surface features disclosed in the examples. For example, the inner platform 282 may be shaped to correspond to a shape of the tip 264 of the vane 186 and/or may be shaped to flare outward in the axial direction A relative to a width of the vane 186 (e.g., a dimension extending from the leading edge 268 to the trailing edge 266 of the vane 186). Each inner platform 282 may be different relative to the other inner platforms 282 in shape, size, and configuration, or may be substantially the same as the other inner platforms 282 in shape, size, and configuration.

The inner platform 282 further defines an area past which air of the core air flowpath 132 (FIG. 1) flows. The specific dimensional aspects of the inner platform 282, as described in greater detail herein, directs the air from the core air flowpath 132 (FIG. 1) in a particular manner. While the flowpath hub is still maintained, an angle of a high-pressure aft cone arm reduces with respect to the longitudinal centerline 102 (FIG. 1), which enables better life for various components.

The seal support structure 284 is generally a component coupled to and disposed inward in the radial direction R of the inner platform 282. The seal support structure supports the seal structure 286 thereon. The seal structure 286 is generally any component that prevents or minimizes fluid leakage from the flow path defined by the inner platform 282. That is, the seal structure 286 functions to maintain fluid flow within the flow path defined by the inner platform 282. In the embodiment depicted in FIG. 2B, the seal structure 286 is an abradable honeycomb seal. That is, the seal structure 286 is a machined component having individual chambers that create a pressure drop to slow leakage and/or disrupt circumferential flow around the HP shaft 128 (FIG. 1). The seal structure 286 forms a seal with the seal teeth 260 that are disposed on the radially outer surface 294 of the spacer arm 210.

It should be appreciated that the seal structure 286 depicted in FIG. 2B is not limited to an abradable honeycomb seal. For example, in other embodiments, the seal structure 286 is a bridge seal, a stick-type seal, a box-type seal, an attached seal ring housing, a foil seal, a brush seal, an advanced aspirating seal, or the like. In some embodiments, the seal structure 286 is selected depending on the size of an inter stage seal (ISS) cavity defined by the spacer arm 210, adjacent rotors 206 and the outer casing 204.

Referring again to FIGS. 2A and 2B, the spacer arms 210 are generally positioned a distance inward from the outer casing 204 in the radial direction R to define spaces for each of the compressor stages 202, including the vanes 186 and the HP compressor blades 188 thereof. The spacer arm 210 of the aft-most stage 202*a* defines-points 292 that are centrally located at an intersection of the spacer arm 210 with each rotor 206 bounding the aft-most stage 202*a*. As will be described in greater detail herein, a first line 291 drawn through both points 292 forms an angle θ with a second line 293 that is parallel to the longitudinal centerline 102 (e.g., in some embodiments, extending through at least one midpoint 290 located equidistant from the trailing edge 266 and the leading edge 268 at the root 262 of a vane 186). The angle θ may be referred to as a spacer angle. It should be understood that since each spacer arm 210 may have a different slope, each compressor stage 202 may have a corresponding spacer angle that is different from a spacer angle of an adjacent or nearby spacer arm. As such, the angle θ depicted in FIG. 2B is referred to as the spacer angle for the aft-most stage 202*a*.

As previously noted herein, the spacer arms 210 includes the radially outer surface 294 and the radially inner surface 296. The radially inner surface 296 is opposite the radially outer surface 294. The radially outer surface 294 of the spacer arms 210 generally faces the vanes 186 and, in some embodiments, supports the one or more seal teeth 260 coupled thereto. The spacer arms 210 generally define a thickness in the radial direction R between the radially outer surface 294 and the radially inner surface 296. In addition, the spacer arms 210 define a midpoint 211 on the radially inner surface 296 that is located equidistant between adjacent points 292, as depicted in FIG. 2B.

As will be described in further detail herein, a first radial distance Ch is defined by a distance in the radial direction R between the first point 272 and the midpoint 211 on the radially inner surface 296 of the corresponding spacer arm 210. That is, the first radial distance Ch represents a distance that includes all of the components disposed between the tip 264 of the vane 186 and the corresponding spacer arm 210, including, in some examples, the inner platform 282, the seal support structure 284, the seal structure 286, the one or more seal teeth 260, and the thickness of the spacer arm 210. This first radial distance Ch may also be referred to as a cavity height. As will also be described in further detail herein, a second radial distance Vh is defined by a distance in the radial direction R between the first point 272 and the second point 274. The second radial distance Vh also represents a height of the vane 186 and may be referred to as a vane height. Further, with reference to FIG. 2A, a third radial distance Rh is defined by a distance in the radial direction R between the first point 272 and the longitudinal centerline 102 of the engine.

Figure 3A:
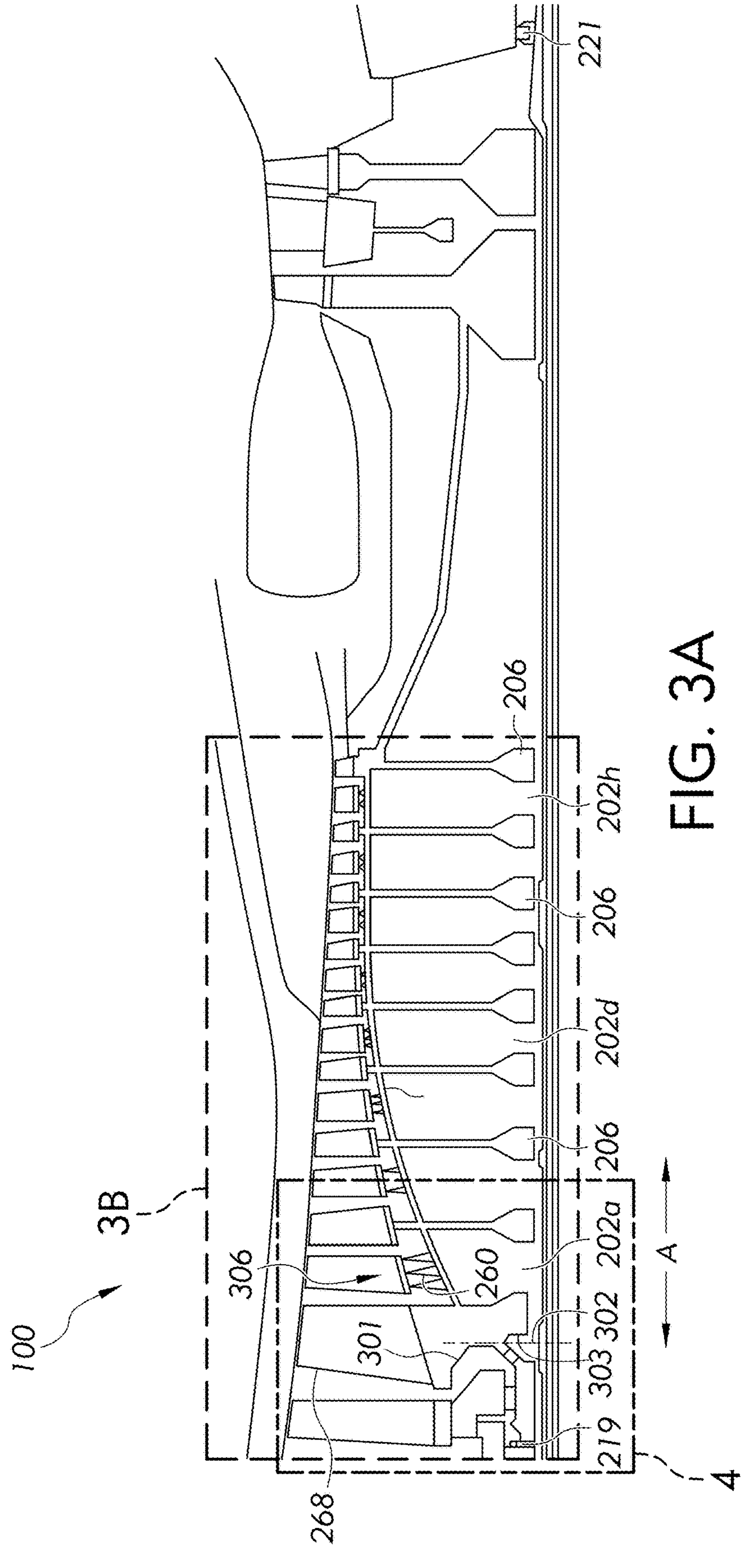
FIG. 3A schematically depicts a partial cross-sectional view of the gas turbine engine of FIG. 1, according to one or more aspects described and illustrated herein.

Referring now to FIG. 3A, a partial cross-sectional view of the turbofan engine 100 of FIG. 1 is schematically depicted. The turbofan engine 100 may include a plurality of compressor stages 202 (such as plurality of compressor stages 202*a*-202*h*), a plurality of rotors 206, a plurality of spacer arms 210, a vertical plane 302, a blisk 304 with an inclined web 301 and an offset bore 303, one or more seal teeth 260, and a plurality of airfoils 306, such as one or more vanes 186 each including a leading edge 268. FIG. 3A may reference and incorporate any constituent components of the turbofan engine 100 as explained above with respect to FIG. 1 and FIGS. 2A-2B. Although single instances of the components are depicted of the turbofan engine 100 of FIG. 3A, it is understood that any number of components may be included. As will be explained below, the dashed box 3B in FIG. 3A corresponds to FIG. 3B, and the dashed box 4 in FIG. 3A corresponds to FIG. 4. As will be further explained below, the blisk 304 with the inclined web 301 and the offset bore 303 is discussed with reference to FIG. 4, and relative to a vertical plane 302 and an angle θ of inclination relative to a segment 305 of the blisk 304.

Figure 3B:
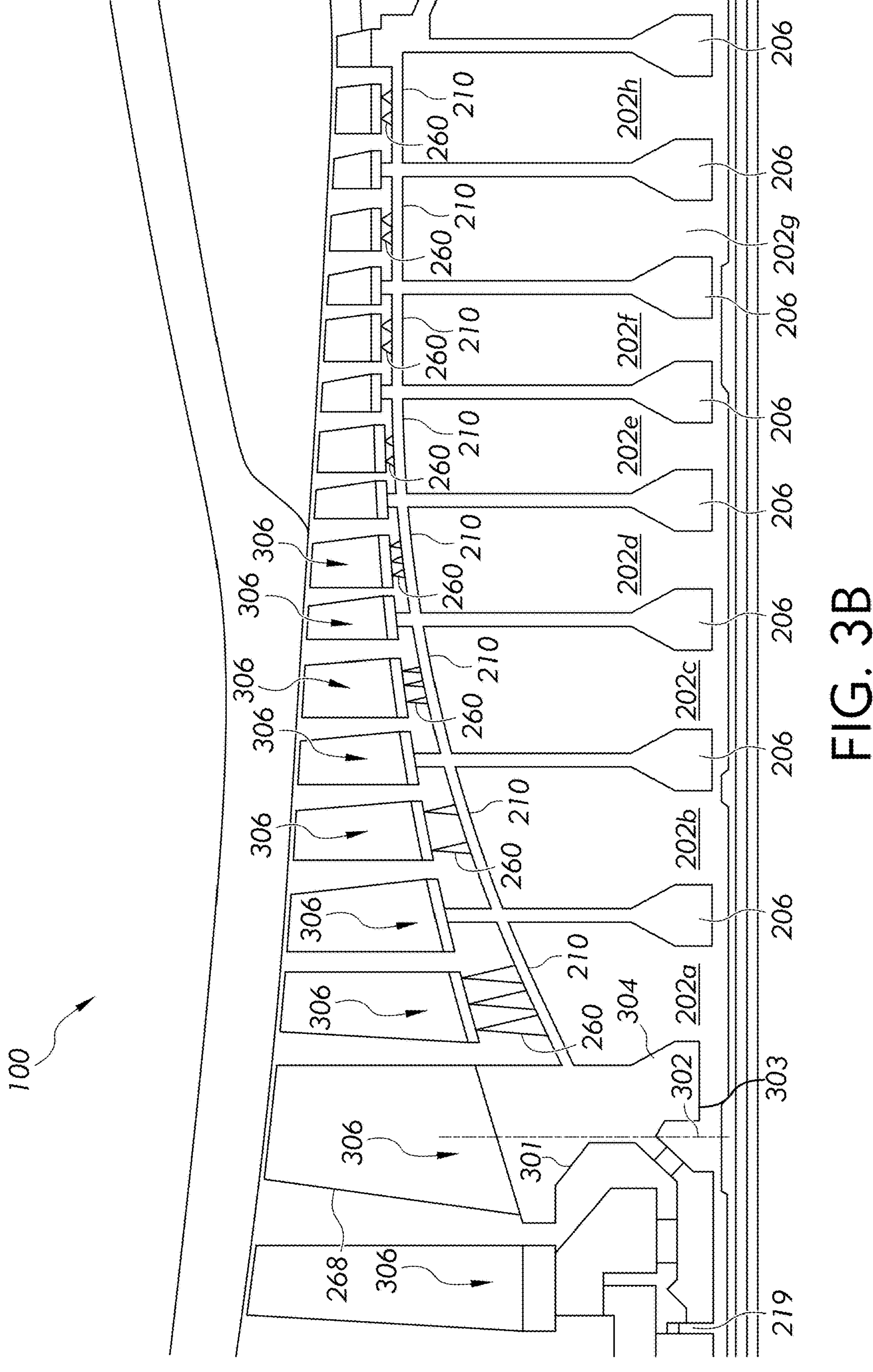
FIG. 3B schematically depicts a detailed view of a portion of the partial cross-sectional view of the gas turbine engine of FIG. 3A, according to one or more aspects described and illustrated herein.

FIG. 3B schematically depicts a detailed view of a portion of the partial cross-sectional view of the turbofan engine 100 of FIG. 3A. At least one of the plurality of compressor stages 202 depicted in FIG. 3B includes a blisk 304 with the inclined web 301 and the offset bore 303. That is, the at least one of the plurality of compressor stages 202 includes a disk with integral/welded blades instead of other forms of blade to disk attachment, such as axial or circumferential dovetail, bolted, or pinned. These are different combinations/types of blade attachments that can be used interchangeably at the at least one of the plurality of compressor states 202 or any other stage of the compressor. Use of the blisk 304 with the inclined web 301 and the offset bore 303 represents an assembly having the lightest weight due to absence of attachment features like dovetails/pins. The vertical plane 302 may indicate the offset bore 303.

The blisk 304 with the inclined web 301 and the offset bore 303 enables to move a first type of bearing 219 closer to a leading edge 268 so that the span between the first type of bearing 219 and a second type of bearing 221 is reduced. For example, such a reduction includes about a one inch reduction relative to the first and second type of bearings 219, 221, which may create the inclined web 301 and/or the offset bore 303 of the blisk 304. The blisk 304 with the inclined web 301 and offset bore 303 may be applied to HPC spool architectures, such as two spool or three spool architectures, with a high bypass ratio or a high inlet radius ratio.

In some examples, the airfoil 306 may be connected to the blisk 304 with the inclined web 301 and the offset bore 303. The plurality of airfoils 306 may include trapezoidal or trapezoidal-like shapes. However, it is understood that the plurality of airfoils 306 are not limited to such shapes, and that any shape for the plurality of airfoils may 306 be used.

In some examples, the first and the second type of bearings 219, 221 may be rectangular or rectangular-like shapes. However, it is understood that the first and the second type of bearings 219, 221 are not limited to such shapes, and that any shape for the first and the second type of bearings may be used.

The turbofan engine 100 may include any number of bearings, such as a first type of bearing 219 and a second type of bearing 221, that are push bearings arranged in front of the compressor. In some examples, a span between the first type of bearing 219 and the second type of bearing 221 is reduced by an inch. The first type of bearing 219 is configured to be disposed closer to the leading edge 268.

The compressor of the turbofan engine 100 may include a plurality of compressor stages 202, which may include axial stages. For example, the plurality of compressor stages 202 may include ten compressor stages. However, it is understood that the plurality of compressor stages 202 are not limited to such number of compressor stages, and that any number of compressor stages 202 may be used. By way of example, a first portion (202*a*-202*e*) of the plurality of compressor stages 202 may include blisks 304 with the inclined web 301 and the offset bore 303, the first portion including five compressor stages. A second portion (202*f*-202*j*) may include circumferential dovetail bladed disks, the second portion including five compressor stages. It is understood that a first predetermined number of a first type of disk and a second predetermined number of a second type of disk are not limited to these types and/or numbers of disks, and that other types of disks may be used. For example, the first predetermined number of the first type of disk may be less than the second predetermined number of the second type of disk. In another example, the first predetermined number of the first type of disk may be equal to the second predetermined number of the second type of disk. In still another example, the first predetermined number of the first type of disk may be greater than the second predetermined number of the second type of disk. Further, the plurality of compressor stages 202 may be welded together. It is understood that the stage count of the plurality of compressor stages 202 is not limited to five or ten compressor stages, and that the stage count of the plurality of compressor stages 202 may vary from one to twelve compressor stages. In still another example, any number of the plurality of compressor stages 202 may include a blisk, such as the blisk 304, a bladed disk with an axial dovetail, a circumferential dovetail, or an attachment (such as a pinned attachment) of a blade to a disk, or any combination thereof. Still further, it is understood that the plurality of stages 202 is applicable to axial compressors or axial stages of axi-centrifugal compressors.

Figure 4:
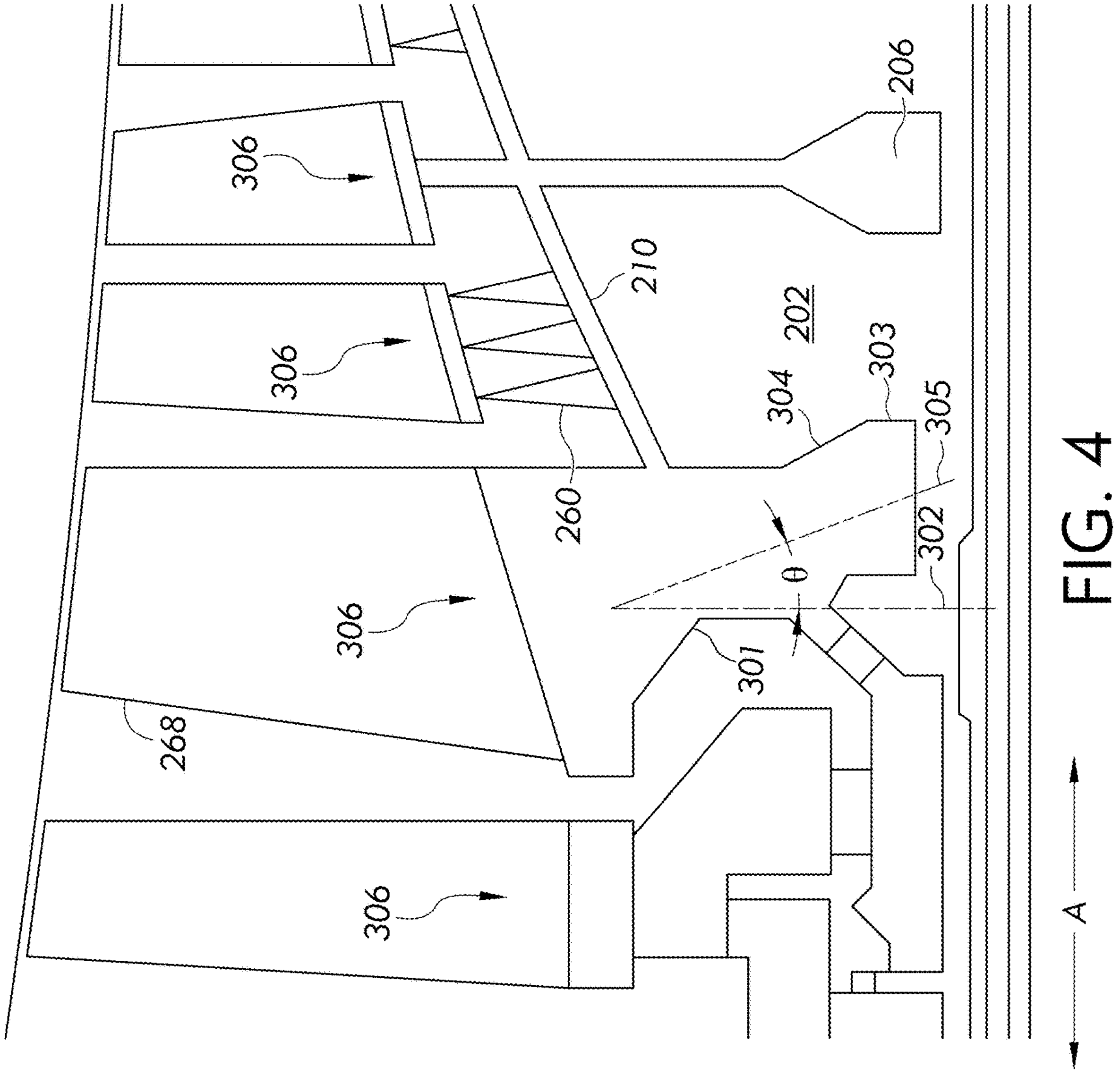
FIG. 4 schematically depicts an enlarged cross-sectional view of a portion of the partial cross-sectional view of the gas turbine engine of FIG. 3A, according to one or more aspects described and illustrated herein.

Referring now to FIG. 4, an enlarged cross-sectional view of a portion of the partial cross-sectional view of the gas turbine engine of FIG. 3A is schematically depicted. The turbofan engine 100 may include a plurality of compressor stages 202, a plurality of rotors 206, a plurality of spacer arms 210, a vertical plane 302, a blisk 304 with the inclined web 301 and the offset bore 303, one or more seal teeth 260, and a plurality of airfoils 306, such as one or more vanes 186 each including a leading edge 268. FIG. 4 may reference and incorporate any constituent components of the turbofan engine 100 as explained above with respect to FIG. 1 and FIGS. 2A-2B and FIGS. 3A-3B. Although single instances of the components are depicted of the turbofan engine 100 of FIG. 4, it is understood that any number of components may be included.

By having the span between the first type of bearing 219 and the second type of bearing 221 reduced by about an inch, this leads to improvements in dynamics margin in both a first type of operation mode and a second type of operation mode. For example, about a 2% improvement in dynamics margin in a high pressure mode (such as the first type of operation mode) is achieved, and about a 4% improvement in a mid-shaft operation mode (such as the second type of operation mode) is achieved. The bore may be offset with respect to the axial direction A.

The vertical plane 302 may indicate the offset bore 303 (which may be offset with respect to the axial direction A), where an angle θ of inclination relative to a segment 305 of the blisk 304 (which may be referred to as the inclined web 301) is between 5° and 55°. The vertical plane 302 may be configured perpendicular to an axial direction (A) that is parallel to a longitudinal centerline (102) defined by the turbofan engine 100. In some examples, the angle θ of inclination relative to the vertical plane 302 is between 10° and 30°. In some examples, the angle θ of inclination relative to the vertical plane 302 is 22°+/−20%. In some examples, the angle θ of inclination relative to the vertical plane 302 is 22°+/−10%. In some examples, the angle θ of inclination relative to the vertical plane 302 is 22°+/−5%.

From the above, it is to be appreciated that defined herein is a compact core arrangement for high bypass ratio gas turbine architecture. In particular, at least one of a plurality of compressor stages of a turbofan engine, such as a first compressor stage, is inclined. In doing so, the overall length (L) (span between bearings) over diameter (D) (diameter of the shaft) (L/D) of the spool is reduced, therefore leading to improved dynamics margin. By having a blisk including an inclined web and offset bore, in which an angle of inclination relative to a vertical plane is between 5° and 55° such that a vertical plane is perpendicular to an axial direction that is parallel to a longitudinal centerline defined by the gas turbine engine, the benefit in improving the dynamics margin is achieved while still retaining the efficiency of that of the plurality of compressor stages that have not been reduced in number.

Although specific features of various embodiments may be shown in some drawings and not in others, this is for convenience only. In accordance with the principles of the present disclosure, any feature of a drawing may be referenced and/or claimed in combination with any feature of any other drawing.

This written description uses examples to disclose the present disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects are provided by the subject matter of the following clauses:

Clause 1. A turbofan engine, comprising: a plurality of compressor stages; a blisk including an inclined web and offset bore; and a plurality of airfoils, wherein an angle of inclination relative to a vertical plane is between 5° and 55°, the vertical plane being perpendicular to an axial direction that is parallel to a longitudinal centerline defined by the turbofan engine.

Clause 2. The turbofan engine according to the previous clause, wherein the angle of inclination relative to the vertical plane is between 10° and 30°.

Clause 3. The turbofan engine according to any preceding clause, wherein the angle of inclination relative to the vertical plane is 22°.

Clause 4. The turbofan engine according to any preceding clause, further comprising a first type of bearing and a second type of bearing, wherein a span between the first type of bearing and the second type of bearing is reduced by an inch.

Clause 5. The turbofan engine according to any preceding clause, wherein at least one of the plurality of compressor stages comprises at least one airfoil that includes a leading edge.

Clause 6. The turbofan engine according to any preceding clause, wherein the first type of bearing is configured to be disposed closer to the leading edge.

Clause 7. The turbofan engine according to any preceding clause, further comprising a two spool architecture.

Clause 8. The turbofan engine according to any preceding clause, further comprising a three spool architecture.

Clause 9. The turbofan engine according to any preceding clause, wherein the plurality of compressor stages comprises ten stages.

Clause 10. The turbofan engine according to any preceding clause, wherein the ten stages comprise a first type of disk and a second type of disk.

Clause 11. The turbofan engine according to any preceding clause, wherein a first predetermined number of the first type of disk comprises five blisks, and a second predetermined number of the second type of disk comprises five circumferential dovetail bladed disks.

Clause 12. The turbofan engine according to any preceding clause, wherein a first predetermined number of the first type of disk is less than a second predetermined number of the second type of disk.

Clause 13. A gas turbine engine, comprising: a compressor section including a first booster, a second booster, a blisk including an inclined web and offset bore, wherein an angle of inclination relative to a vertical plane is between 5° and 55°, the vertical plane being perpendicular to an axial direction that is parallel to a longitudinal centerline defined by the gas turbine engine; a combustion section; a turbine section including a first turbine and a second turbine; and an exhaust section.

Clause 14. The gas turbine engine according to the previous clause, further comprising a first shaft configured to drivingly connect the first turbine to the second booster, and a second shaft configured to drivingly connect the second turbine to the first booster.

Clause 15. The gas turbine engine according to any preceding clause, wherein the first shaft, rotating components of the second booster that are mechanically coupled with the first shaft, and rotating components of the first turbine that are mechanically coupled with the first shaft collectively form a high pressure spool.

Clause 16. The gas turbine engine according to any preceding clause, wherein the second shaft, rotating components of the first booster that are mechanically coupled with the second shaft, and rotating components of the second turbine that are mechanically coupled with the second shaft collectively form a low pressure spool.

Clause 17. The gas turbine engine according to any preceding clause, wherein the compressor section includes a plurality of compressor stages, and at least one of the plurality of compressor stages comprises at least one airfoil that includes a leading edge.

Clause 18. The gas turbine engine according to any preceding clause, wherein the plurality of compressor stages comprises ten stages.

Clause 19. The gas turbine engine according to any preceding clause, wherein the ten stages comprises a first type of disk and a second type of disk.

Clause 20. The gas turbine engine according to any preceding clause, wherein a first predetermined number of the first type of disk is less than a second predetermined number of the second type of disk.

We claim:

1. A turbofan engine, comprising:

a plurality of compressor stages, at least one of which includes a blisk, the blisk including an inclined web, and an offset bore that extends from the inclined web and is offset from a longitudinal center of the inclined web along a longitudinal centerline defined by the turbofan engine;

a plurality of airfoils, at least one airfoil of the plurality of airfoils being connected to the blisk; and a vertical plane that extends through a vertical centerline of the at least one airfoil, the vertical plane being perpendicular to an axial direction that is parallel to the longitudinal centerline, wherein an angle of inclination between the vertical plane and an imaginary line that intersects the vertical plane and extends through the inclined web and a bottom center point of the offset bore is between 5° and 55°.

2. The turbofan engine of claim 1, wherein the angle of inclination is between 10° and 30°.

3. The turbofan engine of claim 1, wherein the angle of inclination is 22°+/−10%.

4. The turbofan engine of claim 1, further comprising a first type of bearing and a second type of bearing, a span being defined as a distance between the first type of bearing and the second type of bearing.

5. The turbofan engine of claim 4, wherein at least one of the plurality of compressor stages comprises the at least one airfoil that includes a leading edge.

6. The turbofan engine of claim 5, wherein the first type of bearing is configured to be disposed closer to the leading edge.

7. The turbofan engine of claim 1, further comprising a two spool architecture.

8. The turbofan engine of claim 1, further comprising a three spool architecture.

9. The turbofan engine of claim 1, wherein the plurality of compressor stages comprises ten stages.

10. The turbofan engine of claim 9, wherein the ten stages comprise a first type of disk and a second type of disk.

11. The turbofan engine of claim 10, wherein a first predetermined number of the first type of disk comprises five blisks, and a second predetermined number of the second type of disk comprises five circumferential dovetail bladed disks.

12. The turbofan engine of claim 10, wherein a first predetermined number of the first type of disk is less than a second predetermined number of the second type of disk.

13. A gas turbine engine, comprising:

a compressor section including a first booster, a second booster, a blisk including an inclined web and an offset bore that extends from the inclined web and is offset from a longitudinal center of the inclined web along a longitudinal centerline defined by the gas turbine engine, and a vertical plane that extends through a vertical centerline of at least one airfoil connected to the blisk, the vertical plane being perpendicular to an axial direction that is parallel to the longitudinal centerline, wherein an angle of inclination between the vertical plane and an imaginary line that intersects the vertical plane and extends through both the inclined web and a bottom center point of the offset bore is between 5° and 55°;

a combustion section connected to the compressor section;

a turbine section connected to the combustion section and including a first turbine and a second turbine; and an exhaust section connected to the turbine section.

14. The gas turbine engine of claim 13, further comprising a first shaft configured to drivingly connect the first turbine to the second booster, and a second shaft configured to drivingly connect the second turbine to the first booster.

15. The gas turbine engine of claim 14, wherein the first shaft, rotating components of the second booster that are mechanically coupled with the first shaft, and rotating components of the first turbine that are mechanically coupled with the first shaft collectively form a high pressure spool.

16. The gas turbine engine of claim 14, wherein the second shaft, rotating components of the first booster that are mechanically coupled with the second shaft, and rotating components of the second turbine that are mechanically coupled with the second shaft collectively form a low pressure spool.

17. The gas turbine engine of claim 13, wherein the compressor section includes a plurality of compressor stages, and at least one of the plurality of compressor stages comprises at least one airfoil that includes a leading edge.

18. The gas turbine engine of claim 17, wherein the plurality of compressor stages comprises ten stages.

19. The gas turbine engine of claim 18, wherein the ten stages comprise a first type of disk and a second type of disk.

20. The gas turbine engine of claim 18, wherein a first predetermined number of the first type of disk is less than a second predetermined number of the second type of disk.

* * * * *